United States Patent [19]

Tanuma et al.

[11] Patent Number: 4,825,133
[45] Date of Patent: Apr. 25, 1989

[54] ELECTROMECHANICAL ACTUATOR CONTROL SYSTEM

[75] Inventors: Jiro Tanuma; Naoji Akutsu; Tadashi Kasai, all of Tokyo, Japan

[73] Assignee: OKI Electric Industry Co., Ltd., Tokyo, Japan

[21] Appl. No.: 79,453

[22] Filed: Jul. 30, 1987

[30] Foreign Application Priority Data

| Aug. 5, 1986 | [JP] | Japan | 61-182728 |
| Aug. 8, 1986 | [JP] | Japan | 61-185237 |
| Aug. 8, 1986 | [JP] | Japan | 61-185238 |
| Oct. 15, 1986 | [JP] | Japan | 61-243089 |

[51] Int. Cl.$^4$ .............................................. H02P 7/68
[52] U.S. Cl. ..................................... 318/113; 318/49; 318/696
[58] Field of Search ............... 307/10 R; 318/49, 82, 318/83, 93, 95, 111, 112, 113, 138, 254, 439, 696, 50, 51

[56] References Cited

U.S. PATENT DOCUMENTS

| 3,386,019 | 5/1968 | Hill | 318/138 |
| 3,509,438 | 4/1970 | Kachuk | 318/254 X |
| 3,746,958 | 7/1973 | Leenhouts | 318/696 |
| 3,757,192 | 9/1973 | Asano et al. | 318/696 |
| 3,797,030 | 3/1974 | Katagiri et al. | 318/696 X |
| 4,289,997 | 9/1981 | Jung et al. | 318/49 X |
| 4,400,654 | 8/1983 | Elliott | 318/312 |
| 4,429,268 | 1/1984 | Yajima et al. | 318/696 |
| 4,468,601 | 8/1984 | Chamron et al. | 318/696 |
| 4,510,422 | 4/1985 | Ogura | 318/254 |

FOREIGN PATENT DOCUMENTS

| 0166220 | 1/1986 | European Pat. Off. |
| 0213576 | 3/1987 | European Pat. Off. | 307/10 R |
| 2156556 | 10/1985 | United Kingdom. |

OTHER PUBLICATIONS

Patent Abstracts of Japan, vol. 6, No. 21, (E-93), (899), Feb. 6, 1982.

*Primary Examiner*—Bentsu Ro
*Attorney, Agent, or Firm*—Spencer & Frank

[57] ABSTRACT

An electromechanical actuator includes an electric motor and a control and drive circuit mounted integrally with the electric motor. The control and drive circuit includes a serial-to-parallel converter for converting a control signal in the form of serial data into parallel data, and a device responsive to the control signal in the form of parallel data for producing a drive current or voltage for the electric motor. A system for accessing or controlling a plurality of such actuators by commands from a main controller can include a control and drive circuit which is integral with the motor itself.

10 Claims, 15 Drawing Sheets

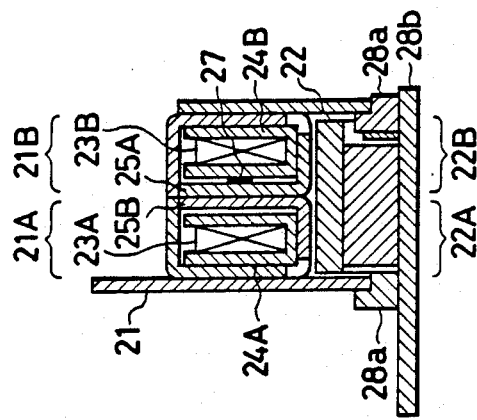
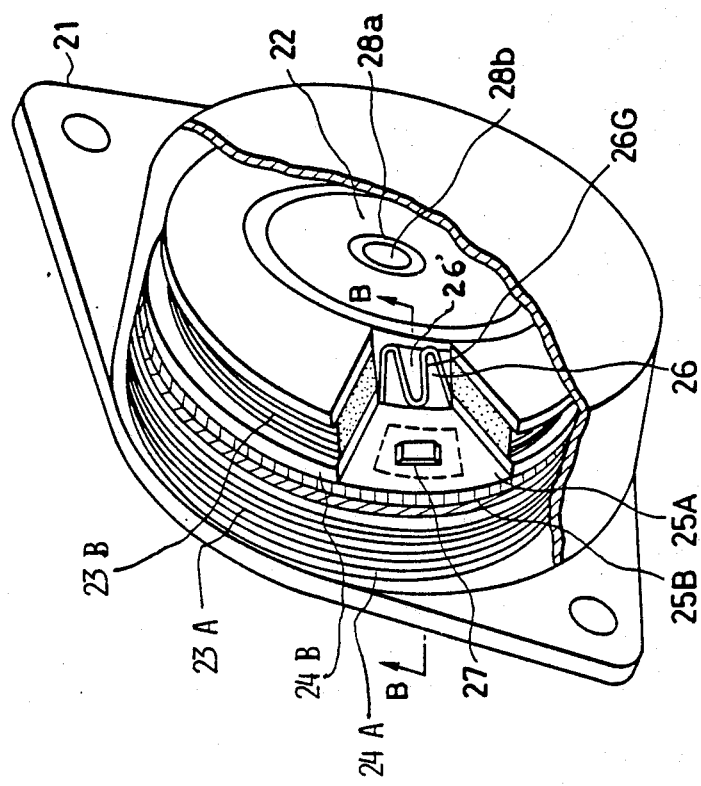

ELECTROMECHANICAL ACTUATOR CONTROL SYSTEM

BACKGROUND OF THE INVENTION

The present invention relates to an electromechanical actuator, and particularly a combination of an electric motor and a control and drive circuit for controlling the operation of the motor itself.

FIG. 1 shows an arrangement including a stepping motor 1, an example of an electric motor, and a drive circuit 2 therefor. The drive circuit 2 comprises power transistors for switching on and off the electric current to the stator windings of the stepping motor 1. A timing control circuit 3 provides the drive circuit 2 with timing control signals to control the timing of the operation of the stepping motor 1. A controller 4 is formed of a microprocessor (CPU) or the like and provides the timing control circuit 3 with control signals. The drive currents to the stepping motor 1 are made to flow through output lines 5. Drive signal lines 6 and control signal lines 7 are also provided. $V_P$ and $E_P$ denote the power supply and the ground for the drive circuit 2. $V_L$ and $E_L$ denote the power supply and the ground for the timing control circuit 3.

The controller 4 provides control signals of a specific mode commanding the direction of rotation, i.e., forward or reverse, and the mode of excitation, i.e., single phase, two phase or signal/two phase, and the number of steps of the movement, to control the timing control circuit 3 which follows a specific procedure. The timing control circuit 3 is responsive to the commands from the controller 4 and determines the phase to be excited, the driving time, and the over-drive time, in accordance with a preprogrammed drive procedure. The timing control circuit 3 continues to supply the drive signals along drive signal lines 6 to the drive circuit 2 until the completion of the movement of the commanded number of steps. To maintain the current fed to the stepping motor 1 constant, a constant-current feedback is provided to control the on/off of the drive signals 6. The drive circuit 2 is responsive to the drive signals 6 and turns on and off power transistors provided therein to turn on and off the the drive currents to each phase of the stepping motor 1. When an overdrive circuit is used, the current reference is switched to a larger value thereby producing a larger torque.

The stepping motor 1 generates torques by the interaction of the vector sum of the magnetic fields generated by the drive currents to respective phases and the magnetic fields of the rotor magnets, and the motor 1 accordingly rotates and stops. The stepping motor 1 rotates for the number of steps commanded by the control signals from the controller 4.

In a conventional arrangement, the controller 4, the timing control circuit 3 and the drive circuit 2 are mounted on a board separate from the stepping motor 1. Connecting wires or wiring boards are used for conducting the drive currents from the board on which the timing control and drive circuits 2 and 3 are mounted, to the stepping motor 1.

The aforementioned prior art arrangement for driving a motor has the following drawbacks:

(i) The board for the drive circuit and other components is disposed externally to the stepping motor, and therefore a large number of conductors are required between the board and the stepping motor. This forms an obstacle to reduction in size and reduction in cost.

(ii) The conductors 5 between the board and the stepping motor can create interfering electromagnetic fields.

(iii) When the stepping motor is driven with a high power, a heat sink must be provided on each wiring board for heat dissipation. This also forms an obstacle to size reduction and cost reduction.

(iv) When a number of stepping motors must be driven, separate conductors are needed for each of the motors. The total number of conductors can therefore be very large.

SUMMARY OF THE INVENTION

An object of the invention is to reduce the number of conductors required for driving a motor or motors.

Another object of the invention is to reduce radiation from interfering electromagnetic fields.

A further object of the invention is to provide a structure which facilitates heat dissipation.

A further object of the invention is to enable a size reduction of the required circuitry for driving a stepping motor and cost reduction.

According to one aspect of the invention, there is provided an electromechanical actuator including
an electric motor,
a control and drive circuit mounted integrally with the electric motor, the control and drive circuit comprising a serial-to-parallel converter for converting a control signal in the form of serial data into parallel data, and
means responsive to the control signal in the form of parallel data for producing a drive current or drive voltage for the electric motor.

According to another aspect of the invention, there is provided a system for accessing by means of commands from a main controller a plurality of electromechanical actuators, in which each actuator is connected to a serial line and its control section comprises: (a) a serial data receiver; (b) a processor for determining from address data in the serial data received whether the data constitute a command to be executed by this controller and, if they do not, for modifying the serial data for sending to another actuator; and (c) a transmitter for sending the modified serial data.

In the system described above, data received from a serial line by a receiver are processed in a fixed manner by a processor, and the result is compared with a certain fixed value. If the result matches the fixed value, the data are executed as a command for this actuator. If the result does not match the fixed value, the processed data are substituted into the serial data, which are sent to another actuator.

According to a further aspect of the invention, there is provided a system for accessing, by means of commands from a main controller, a plurality of electromechanical actuators, in which each actuator is connected to a serial line and its control section comprises: (a) an address register in which a common value is set when the actuator is initialized; and (b) an interface controller that, when an address received in serial data from the serial line matches the fixed value in the address register, writes in the address register an address specific to the actuator and also closes a bypass circuit for output of the unaltered serial data, then executes subsequent processes according to the serial data received.

In the system described above, the address registers of all the controllers are initialized to the same fixed value. When an address contained in received serial data matches the fixed value, an address specific to the particular actuator is set in the address register. When initialization in this manner is completed, subsequent processing by each actuator is governed by an actuator-specific address in the serial data. When the address is set, a bypass circuit is also closed for output of the unaltered received data.

According to a further aspect of the invention, there is provided an actuator control system comprising: a plurality of actuators, each having an electric motor, a driver for driving the motor, and a control section for sending control signals to the driver; a controller for controlling the plurality of the actuators; and a serial data line for linking the actuators in series to the controller. The control section in each actuator comprises (a) an address register, settable by the controller, for storing an address value specific to the actuator; (b) initializing means for setting an initial value in the address register when a power-on reset or initial reset is performed; (c) an address-setting means for setting an address value specific to the actuator in the address register according to serial data received from the controller at initial setup; and (d) a command-processing-/serial-data-sending means for comparing an address value in serial data received after the initial setup with the address value in the address register and, if the two values are equal, executing the process commanded by the controller and inhibiting the sending of the input serial data to the next actuator or, if the two values are not equal, sending the input serial data unaltered to the next actuator.

In the above system, the actuator is provided with an address register in which an actuator address designated by the controller can be set by software means. The initializing means clears the address register at a power-on reset or initial reset, so that all actuators have the same value in their address registers. After initialization, the address-setting means sets in the address register an address value designated in serial data received from the controller. The command-processing/serial-data sending means compares an address value contained in input serial data with the value in the address register. If the two values are equal, the data are regarded as a command to this actuator, and the command, which may include the address-setting process described above, is executed; sending of the input serial data is inhibited. If the two values are not equal, the command-processing/serial-data-sending means simply sends the input serial data out again. Accordingly, the above system does not require separate address data to be hard-wired into each actuator, and it uses an improved serial line system that requires only a small number of lines.

BRIEF DESCRIPTION OF THE DRAWINGS

FIG. 4A is a perspective view taken, partially broken away, showing a motor assembly.

FIG. 4B is a cross sectional view along line B—B in FIG. 4A.

DETAILED DESCRIPTION OF THE PREFERRED EMBODIMENTS

Figure 1:
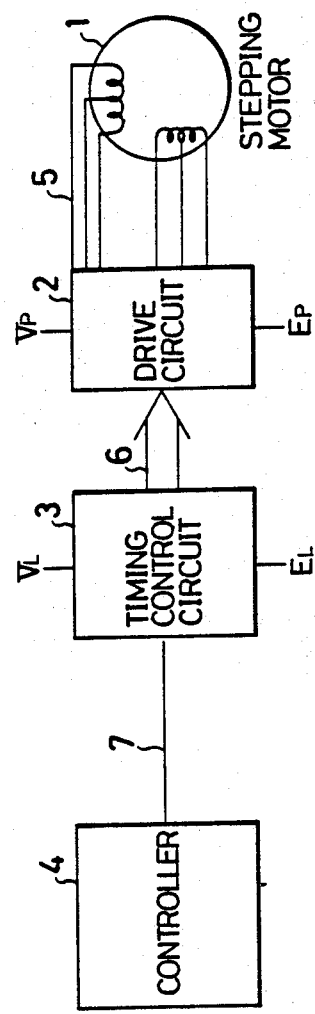
FIG. 1 is a prior art arrangement for driving a stepping motor.
Figure 2:
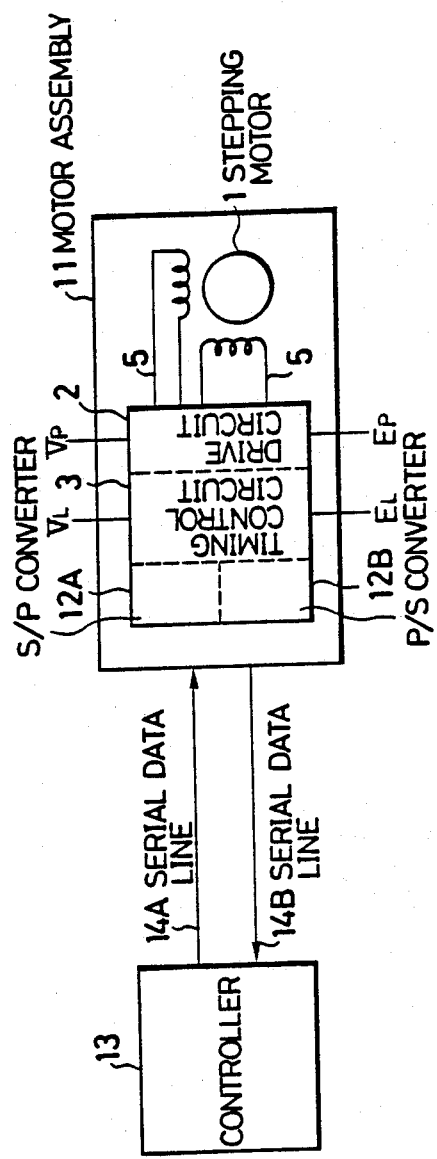
FIG. 2 is a block diagram showing an electromechanical actuator.

FIG. 2 shows, in block diagram, an embodiment of the invention. The components having identical or similar functions to those in FIG. 1 are designated by identical reference numerals. An electromechanical actuator of this embodiment is a stepping motor assembly 11 which comprises a stepping motor 1, a drive circuit 2, a timing control circuit 3, a serial-to-parallel (S/P) converter 12A and a parallel-to-serial (P/S) converter 12B. These circuits are implemented in an IC chip and are mounted on a metal substrate forming part of the motor.

The S/P converter 12A converts control signals in the form of serial data into parallel data and holds them. The P/S converter 12B converts signals in the form of parallel data into serial data and holds them.

The controller 13 has the same function as the controller 4 in FIG. 1. In addition, it converts the control signals of the parallel data into serial data and supplies the serial data through the serial data line 14A to the S/P converter 12A of the stepping motor assembly.

Control signals in the form of serial data are supplied from the controller 13 to the S/P converter 12A, where they are converted into parallel data. According to this parallel data, the timing control circuit 3 produces drive signals and sends them to the drive circuit 2. In accordance with the drive signals, the drive circuit 2 produces drive currents and supplies them to the windings of the respective phases of the stepping motor 1. The stepping motor 1 is thereby driven. These operations are similar to those described with reference to FIG. 1.

Figure 3:
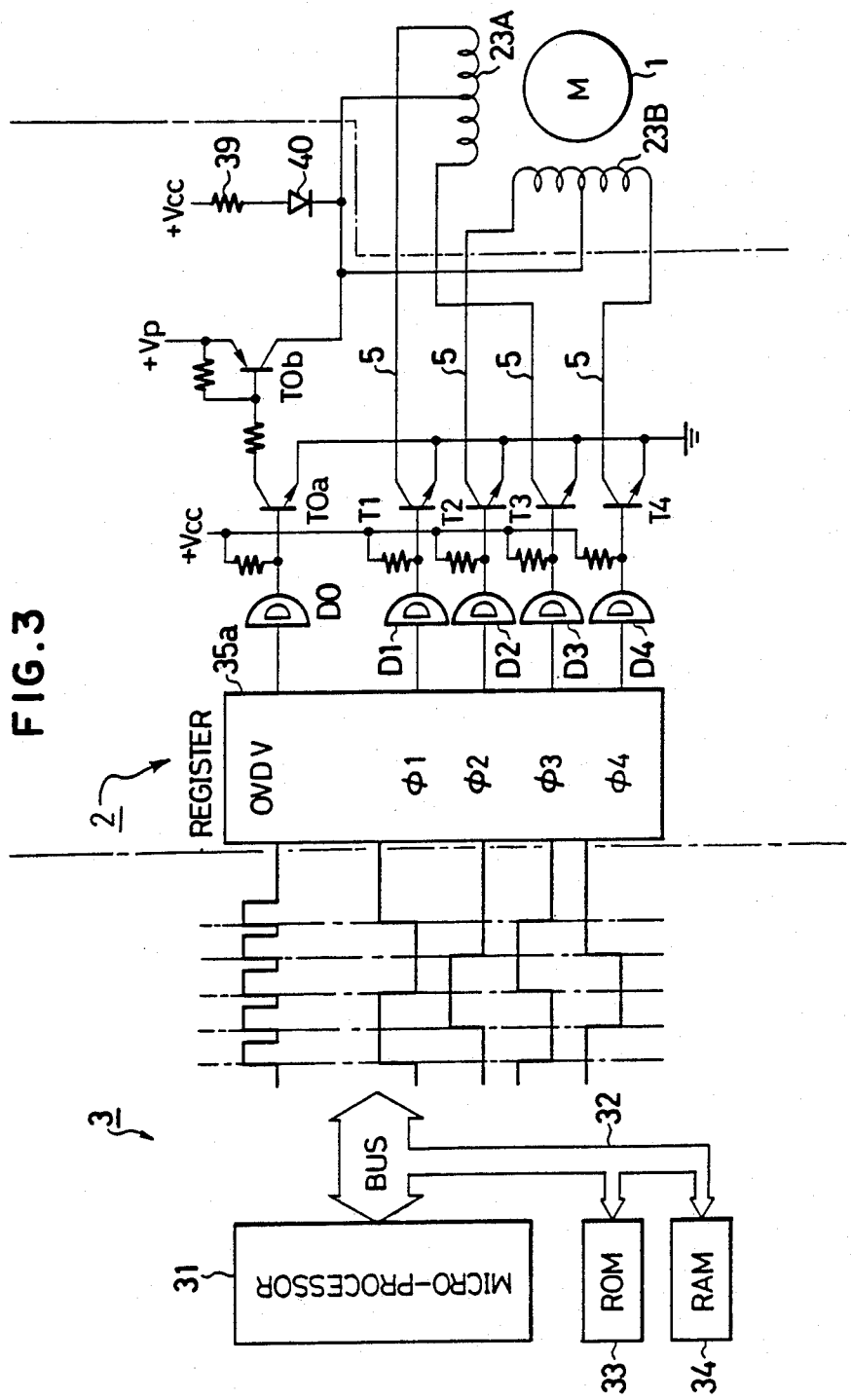
FIG. 3 is a diagram showing an example of a timing control circuit and a drive circuit.

An example of the timing control circuit 3 and the drive circuit 2 is shown in FIG. 3. The timing control circuit 3 comprises a microprocessor 31, a ROM 33 storing programs, and a RAM 34 storing various data.

They are interconnected via a bus 32. The drive circuit 2 comprises a register 35a which receives timing signals from the microprocessor 31 and produces control signals OVDV, φ1, φ2, φ3 and φ4. These control signals are supplied through open-collector drivers D0, D1 to D4 to the respective bases of transistors T0a, T1 to T4 whose emitters are grounded. The collector of the transistor T0a is coupled to the base of an additional transistor T0b whose emitter is connected to an over-voltage drive power supply Vp (e.g. 38 V). The collector of the transistor T0b is connected to center taps of stator windings 23A, 23B. Ends of the windings 23A, 23B are connected to the collectors of the transistors T1 to T4. The center taps of the windings 23A, 23B are also coupled through a diode 40 and a resistor 39 to a logic-level power supply Vcc.

At the beginning of each cycle for each step, the open-collector driver D0 as well as the transistors T0a and T0b are made conductive by the control signal OVDV, and the over-drive power supply Vp is connected to the stator windings through the transistor T0b. When the transistor T0b is nonconductive, the power supply Vcc of a lower voltage supplies current to the stator windings 23A, 23B. This current produces holding torque when periodical and sequential alternation of the signals φ1 to φ4 are stopped. when a command for rotating the stepping motor for a certain amount, e.g., for a line feed (or carriage return in the case of a printer) is supplied from the controller, the signals φ1 to φ4 are alternated in sequence. The overdrive voltage Vp is applied in the former part of each cycle for each step. In the latter part of each cycle for each step a lower voltage Vcc is applied. The voltages are used for rotating the stepping motor 1. Thus the stepping motor 1 is driven for the commanded amount, e.g., to feed the printing media by the predetermined amount.

After the rotation by the commanded amount, the alternation of the signals φ1 to φ4 is terminated and the states of the signals φ1 to φ4 at the time of the termination of the alternation of the signals φ1 to φ4 are maintained. That is, two of the signals φ1 to φ4 that are at the high level at the time the alternation is terminated are kept high and the other two of the signals φ1 to φ4 that are at the low level at the time the alternation is terminated are kept low. As a result, a holding torque is generated in the stepping motor 1 by the current which flows from the power supply Vcc through the resistor 39 and the diode 40. The holding torque prevents the printing media from being moved by external forces.

When the rotation for the commanded amount is completed, parallel data indicating such completion is produced by the timing control circuit 3 and is converted by the P/S converter 12B into serial data and transmitted to the controller 13. Parallel data indicating the temperature within the motor 1 and parallel data indicating disconnection of the wire (or associated connector) are also produced by the timing control circuit 3, and are converted by the P/S converter 12B into serial data that are transmitted to the controller 13.

As can be seen from FIG. 2, the output lines 5 from the drive circuit 2 that were required in the arrangement of FIG. 1, are disposed within the motor assembly 11 and need not run external to the housing of the motor assembly 11. the only conductors that must be disposed outside the motor assembly 11 are those for connecting the controller 13 with the S/P and P/S converters 12A and 12B. These conductors include the conductors 14A for transmission of serial data of control signals and the conductor 14B for transmission of serial data from the motor assembly 11 to the controller 13.

FIG. 4A shows an example of the structure of the motor assembly 11. FIG. 4B shows a cross section taken along line B—B of FIG. 4A. As illustrated, the motor assembly 11 comprises an outer frame 21 which is formed of a magnetic material such as iron and also serves as a mounting flange and a cover for the stepping motor 1. The motor comprises two sections 21A, 21B divided in the direction of a shaft 28b. The windings 23A, 23B of the two sections 21A, 21B are wound on bobbins 24A, 24B, which are mounted on and fixed to respective metal plates (such as iron plates) 25A, 25B. The ends of the windings are soldered for electrical connection.

Each of the metal plates 25A and 25B is wrapped around respective winding 23A or 23B on the respective bobbin 24A or 24B. A radially inner part of each respective metal plate 25A, 25B is formed into teeth 26 that extend from opposite end parts of the metal plates 25A and 25B, the respective teeth 26, 26' being separated by a gap 26G. The teeth 26 from opposite ends have opposite magnetic poles N and S when the winding is excited. The windings of the two sections are offset from each other electrically by a 90 degree phase angle, so that the motor can operate in two-phase excitation.

A rotor 22 is mounted on the shaft 28b that is received by bearings 28a which in turn is fixed to the outer frame 21.

The rotor 22 is formed of a magnet material such as ferrite or a rare earth material. The rotor 22 is magnetized in exhibit N and S poles alternately along its circumference.

Magnetic flux created by the excitation of the windings 23A, 23B passes through the metal plates 25A, 25B and the teeth 26 to interact with the magnetic poles to produce attracting and repelling forces and hence rotational and holding torques.

A circuit pattern (with an intervening insulator) is formed on an internal surface of the metal plate 25A, and an IC chip 27 is mounted on the metal plate. The S/P converter 12A, the P/S converter 12B, the timing control circuit 3 and the drive circuit 2 are implemented in the IC chip 27.

The outputs of the drive circuit 2 are connected to the windings on the pattern of the metal plate 25A. The drive currents are fed through these connections.

The conductors for the drive currents are disposed inside the metal plates 25A, 25B except where they pass through the end parts of the metal plates 25A, 25B adjoining each other.

Figure 5:
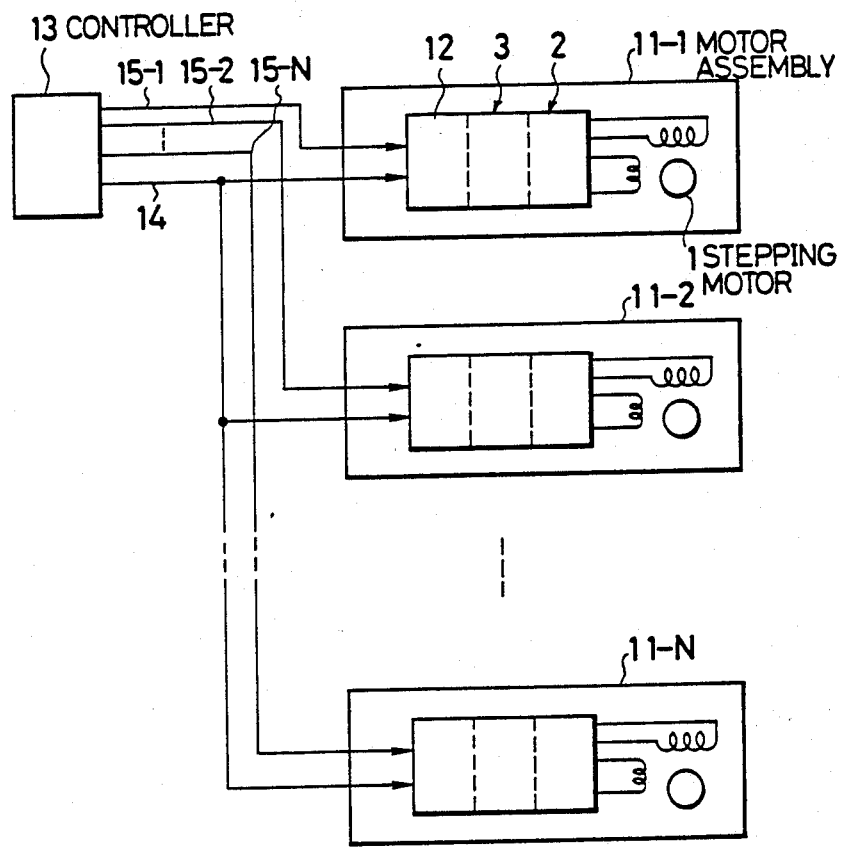
FIG. 5 is a block diagram showing a system including a plurality of motor assemblies and a single controller.

FIG. 5 shows a system in which a plurality of motor assemblies 11 are connected in parallel with a single controller 13. A serial data line 14 is connected to all the motor assemblies 11-1 to 11-N. In the same way as with the arrangement of FIG. 2, the control signals from the controller 13 are used for driving each respective stepping motor 1. Select lines 15-1 to 15-N are used for conducting select signals, by which the control signals are input to the selected one of the motor assemblies 11-1 to 11-N.

In the above description, the IC chip 27 by which the drive circuit and the like are implemented is mounted in the motor assembly 11. In a modification, a power supply circuit including a DC/DC converter can also be implemented as part of the IC chip 27. With such an arrangement, a single power supply suffices for $V_L$ and $V_P$. Similarly, in this modification a ground line can then be shared for $E_L$ and $E_P$.

In the system of FIG. 5, select lines 15-1 to 15-N are used for selection of one of the motor assemblies 11-1 through 11-N. Alternatively, the motor assemblies 11-1 through 11-N and the controller 13 can be connected by an address bus through which an address signal is supplied from the controller 13 to the motor assemblies 11-1 through 11-N. In this case each of the motor assemblies 11-1 through 11-N should include an address decoder and a switching circuit.

In the embodiment described, each motor assembly comprises a stepping motor. Each motor assembly can alternatively comprise a DC motor such as a flat-type DC brushless motor. Moreover, the motor can be of any other type. Instead of a motor in which drive currents are supplied to windings, motors which operate on drive voltages can also be incorporated in the motor assembly.

In the embodiment described above, a control and drive circuit in the form of the IC chip 27 including an S/P converter and a P/S converter, a drive circuit for producing a drive current or voltage are provided in the motor assembly. The interconnection of a controller and the motor assembly is thereby simplified.

Since the conductors for transmitting drive currents or voltages can be conveniently covered by a metal cover and thereby magnetically shielded, leakage of interfering electromagnetic fields therein can be prevented.

Moreover, the circuitry in the IC chip 27 is mounted on a metal plate, whose heat capacity is large, so that effective cooling of the IC chip 27 and radiation of heat from the IC chip 27 are ensured.

The actuator control system, having a main controller in communication with a plurality of actuators which each have a control and drive circuit incorporated with an actuator motor, can be used for accessing or controlling the plurality of actuators by command signals supplied by the main controller in the form of serial data. A description of several embodiments of such systems follow.

Figure 6:
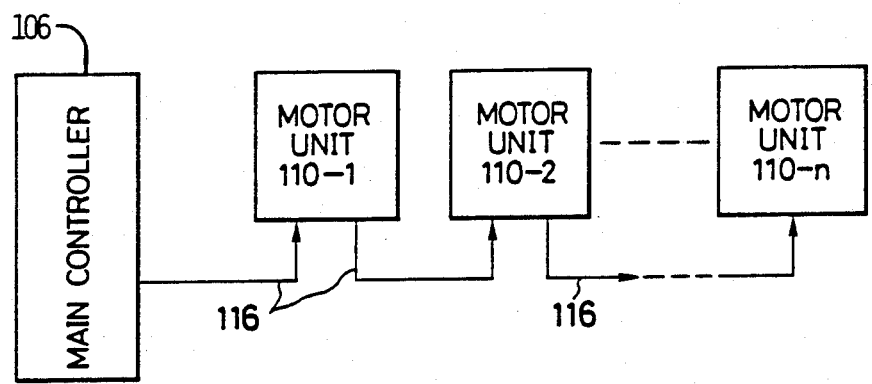
FIG. 6 is a schematic diagram of serial data line interconnections in an actuator accessing system of an embodiment of this invention.

FIG. 6 is an overall schematic diagram of the ocnfiguration of a first embodiment of such a system. A plurality of motor units 110-1 through 110-n are connected in series by a serial data line 116 which sends the output from a main controller 106 to a receiver circuit in the motor unit 110-1, then sends the output from the transmitter in the motor unit 110-1 to a receiver in the motor unit 110-2, and so on in analogous fashion by sending the output from the motor unit 110-(k−1) to the next downstream motor unit 110-k, where $2 \leq k \leq n$.

Figure 7:
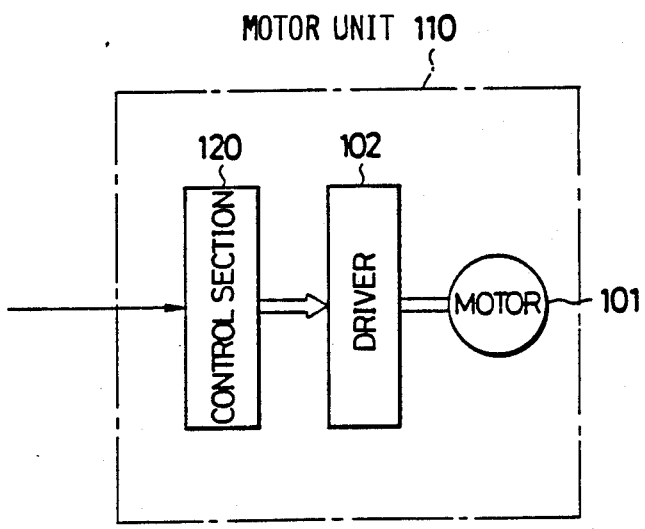
FIG. 7 is a block diagram of a motor unit for use in the system of FIG. 6.

FIG. 7 is a block diagram of an example of a typical motor unit 110. The motor unit 110 includes a motor 101, a driver 102 (which corresponds to the drive circuit 2 of FIG. 2) for sending signals to drive the motor 101, and a control section 120 for sending signals to control the driver 102.

Figure 8:
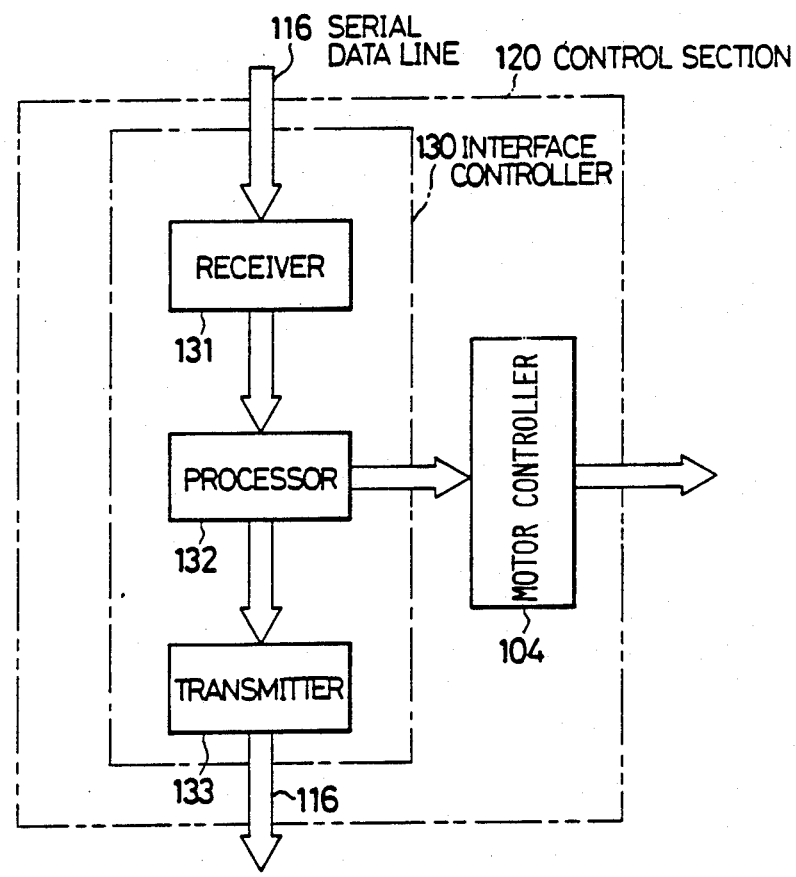
FIG. 8 is a block diagram of a control section of the actuator of FIG. 7.

FIG. 8 is a block diagram of the control section 120. As the diagram shows, the control section 120 has an interface controller 130 which comprises a receiver 131 for receiving serial data from a serial data line 116, a processor 132 for processing the data thus received in a manner to be described later, and a transmitter 133 for sending the data to another actuator if these data are not to be acted on by this actuator. It also has a motor controller 104 which, if the data are to be acted on by this actuator, sends control signals to the motor driver as in the prior art.

The actuator control system of embodiment operates as follows. The process performed by the interface controller 130 is set forth in the flowchart in FIG. 9. As shown in FIG. 10, serial data 140 received by the receiver 131 (step S101) comprise an address field 141 and a data field 142. The address data (labeled ADD) in the address field 141 are extracted (step S102) and processed by the processor 132 (step S103).

The process performed is a decrementation that can be written as ADDM1=ADD−1, yielding a result ADDM1 which is compared with fixed data such as 0 (step S104). If the result equals the fixed data, the process branches to step S107: the serial data are recognized as comprising a command for this motor unit and the data (labeled DATA) in the data field 142 are decoded to begin the process of driving the motor.

Figure 11:
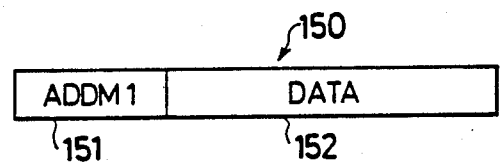
FIG. 11 is a diagram of the format of the serial data sent by the actuator of the above embodiment.

If the decremented value ADDM1 is not equal to the fixed data (such as 0) when compared in step S104, the serial data are recognized as pertaining to another motor unit, and the processed value ADDM1 is set in the address field of the serial data (step S105). The data now consist of the address data 151 (ADDM1) and the data 152 (labeled DATA) in FIG. 11. These serial data 150 are for output, and are sent on the serial line 116 by the serial data transmitter 133 (step S106).

The next downstream motor unit receives the output serial data 150 thus sent as input serial data 140 and repeats the same process as above.

A major advantage of the above system is that, differing from the serial line system of a prior art, it is not necessary for an address to be hard-wired into a circuit in each of the motor units 110-1 through 110-N, so the hardware in each of the motor units 110-1 through 110-N can be identical.

The data-processing step in the above arrangement is a decrement process, but an increment process could be used as well and would provide the same effect.

Figure 12:
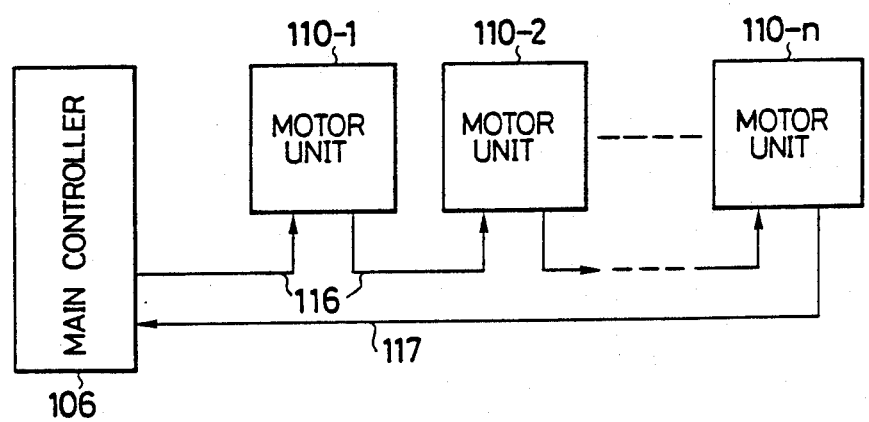
FIG. 12 is a schematic diagram of the serial data line interconnections in another embodiment of that invention.

FIG. 12 is an overall schematic diagram of another embodiment of the actuator control system. As the diagram indicates, the transmitter of the final motor unit 110-n is coupled to a receiver in the main controller 106, enabling bidirectional communication of the main controller 106 with the motor units 110-1 through 110-n. The configuration of the control section in this embodiment is the same as in FIG. 8.

Figure 9:
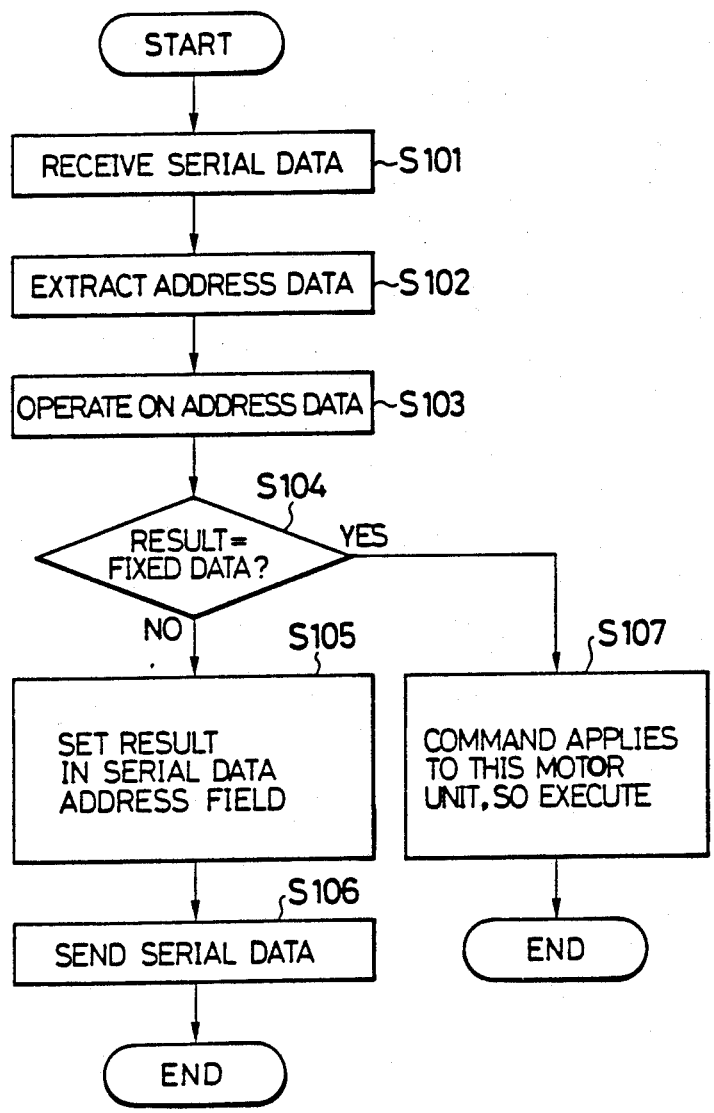
FIG. 9 is a flowchart showing the operation of the embodiment of FIG. 6.
Figure 10:
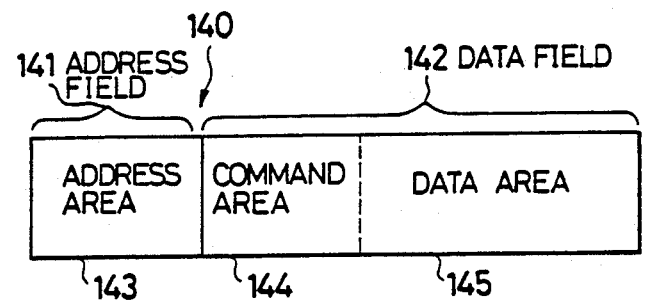
FIG. 10 is a diagram of the format of the serial data received by the actuator of the embodiment of FIG. 6.
Figure 13:
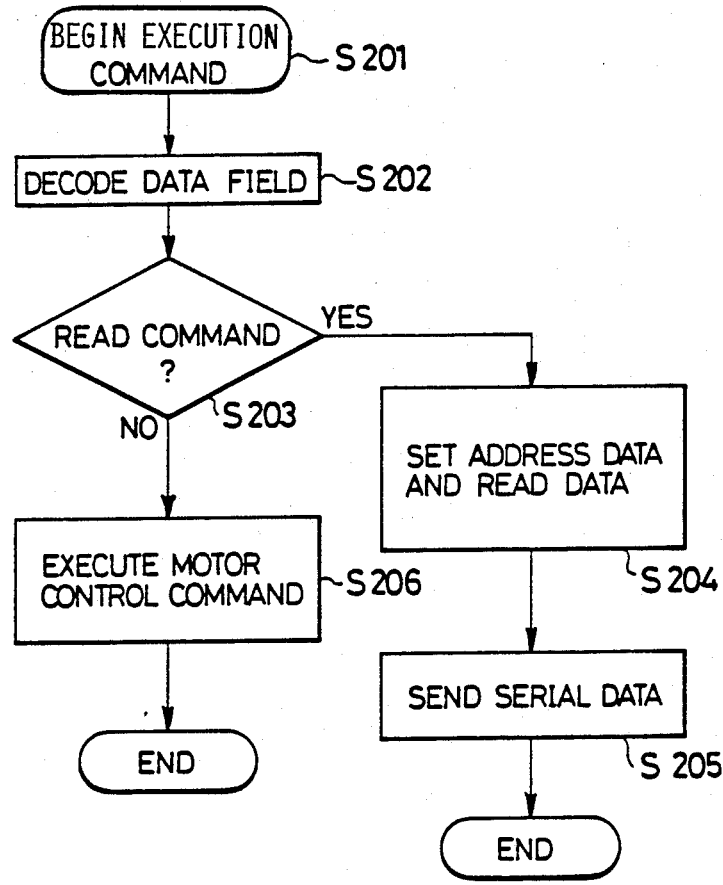
FIG. 13 is a flowchart showing the operation of the system of FIG. 12.

The process of bidirectional communication is shown in the flowchart in FIG. 13, which corresponds to step S107 in FIG. 9. The data field in the serial data includes a command area, and one of the commands can be a READ command.

Figure 14:
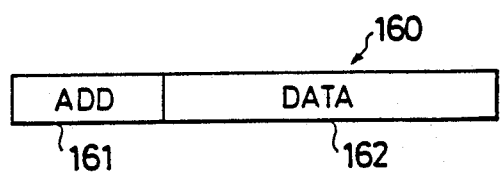
FIG. 14 is a diagram of the format of the serial data sent in the embodiment of FIG. 12.

The operations carried out in FIG. 13 are as follows. When a request to read data comes from the main controller 106, the addressed motor unit, for example the motor unit 110-1, after beginning execution of the command (step S201), decodes the data field 142, including the command stored in the command area 144 (step S202), and determines whether the command is a READ command or a motor control command (step S203). If the command is a READ command, the requisite read data (such as status data) are written as shown in FIG. 14 in the data field 162 of the outgoing serial data 160 and 0 is written in the address field 161 (step S204), then these output serial data 160 are sent (step S205).

The address field 161 in the read data sent from the motor unit 110-1 in this way is decremented as it passes through the other intermediate motor units 110-2 through 110-n and is received at the receiver of the main controller 106 with the value −m (after passing through m motor units). The main controller 106 can thus determine from which motor unit 110-n the message comes.

Although the process performed on the address field 161 in the above embodiments is a decrement process, an increment process, a right-shift (divide-by-2) process, or a left-shift (multiply-by-2) process could be used instead. Furthermore, the fixed data need not be 0 but could be the hexadecimal value FF . . . or any other constant value. Such modifications would not depart from the scope of the processes described in the above embodiments.

As explained above, the embodiments of FIGS. 6 to 14 do not require differing address data to be hardwired into each actuator, so the entire circuit can be implemented in an integrated-circuit chip, thereby simplifying the production process, reducing costs, and increasing reliability. The foregoing actuator control system embodiments also enable a large number of actuators to be connected on a single serial data line, thereby reducing the overall number of interconnection lines and offering great advantages in mounting and cost. Furthermore, if the output from the final actuator is connected to the main controller, bidirectional communication between a main controller and a large number of devices can be easily realized with a small number of bus lines.

Figure 15:
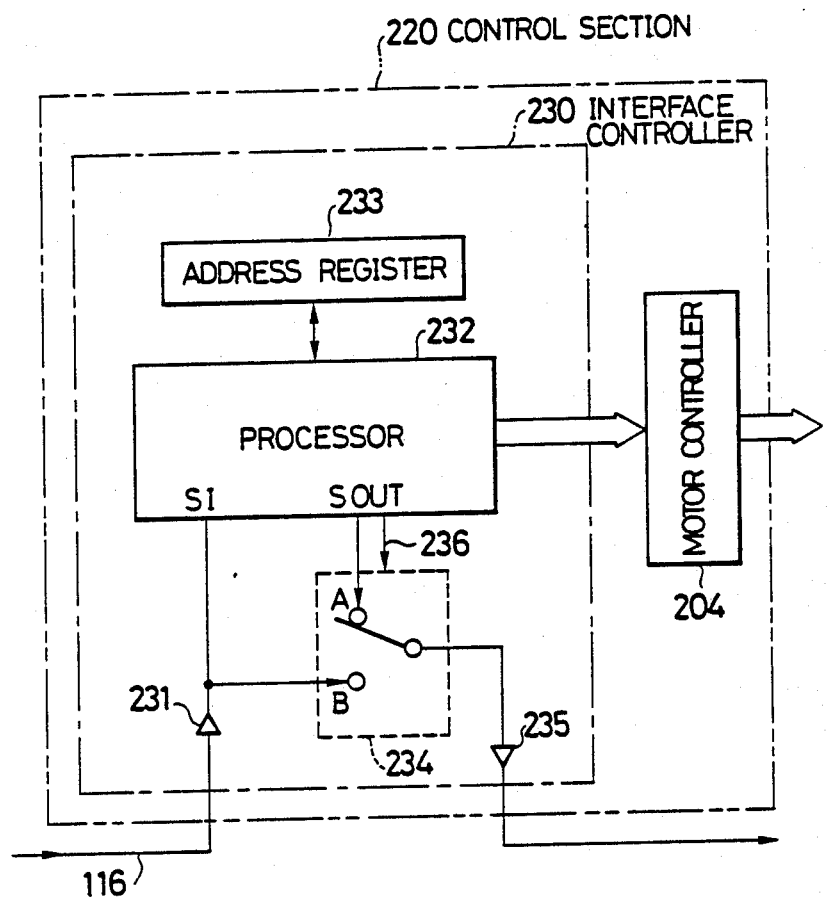
FIG. 15 is a block diagram of another embodiment of a motor control section in another embodiment of the invention.

In a further embodiment of the invention, which except for the control section structure is generally identical to the actuator control system shown in FIGS. 6 and 7, a control section 220 (corresponding to the control section 120 of FIGS. 7 and 8) is as shown in FIG. 15. As illustrated, the central section 220 includes an interface controller 230 and a motor controller 204. The interface controller 230 comprises a processor 232 connected via an input buffer 231 to the serial line 116, an address register 233 for storing an address, a switch 234 for selecting either the data from the input buffer 231 or the output of the processor 232, and an output buffer 235 for output of the data selected by the switch 234 to the serial line 216.

This actuator control system embodiment operates as follows. The overall process performed by the embodiment shown in FIGS. 15 and 6 is described by the flowchart in FIG. 16.

When the system in FIG. 6 is powered on, first a system power-on reset process is carried out (step S301) in which each actuator is initialized. Next addresses are set in motor units 110-1 through 110-n by signals sent from the main controller 106 (step S302). This step is performed sequentially for motor units 110-1 through 110-n as described further hereunder. When all addresses have been set (step S303), command execution begins (step S304).

In other words, the main controller 106 accesses a particular one of the motor units 110-1 through 110-n by use of the individual addresses set in step S302.

Figure 17:
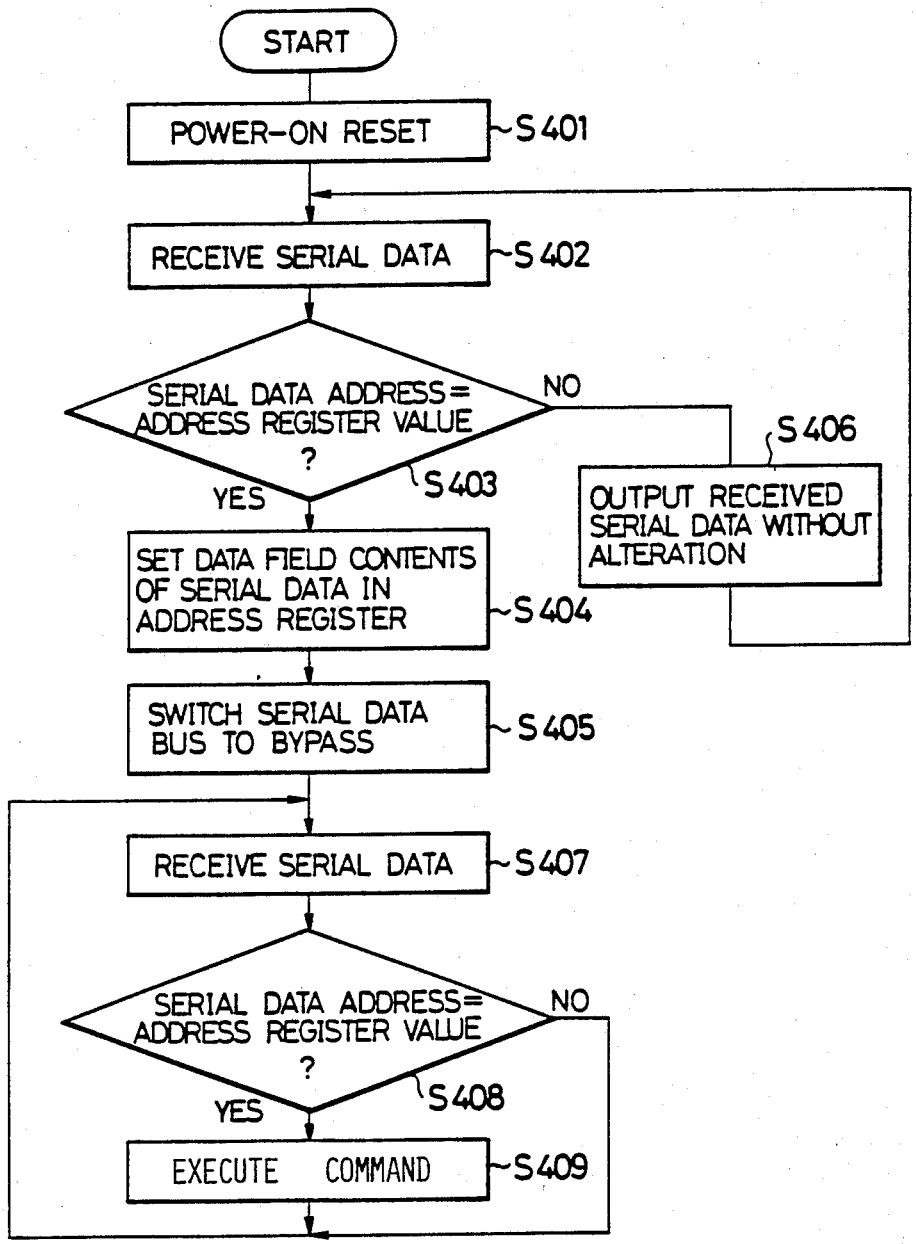

The process performed in the interface controller 230 in the control section 220 in FIG. 15 is set forth in the flowchart in FIG. 17. When the system is powered on, each respective control 220 is reset by an internal signal, or cleared by input of a Reset signal (step S401). This step initializes all registers and counters in each control 220 and clears all their respective address registers to have the same initial value (0, for example).

Next, the address-setting mode is entered. The main controller 106 first sends an address-setting command to the first motor unit 110-1 in the series of motor units to which it is coupled. As shown in FIG. 10, the serial data 140 received by the motor unit 110-1 comprise an address field 141, in the address area 143 of which is set the value (0) to which the address register was initially set, and a data field 142, in the command area 144 of which is set the address-setting command, and in the data area 145 of which is set the address to be assigned to motor unit 110-1 (the address "1" for example).

When the motor unit 110-1 receives the above serial data (step S402), it first tests whether the value in the address field 141 of the serial data equals the value (0) in the address register (step S403). If the two values are equal (as they are in this case because both are 0), the serial data are recognized as a command to the first motor unit 110-1. The value in the command area 144 of the data field 142 indicates that the command is an address-setting command, so the value (1) in the data area 145 is latched in the address register 233 (step S404), thus completing the setting of the address of motor unit 110-1.

Since the serial data were determined to be a command to the first motor unit 110-1, the process stops here and no serial data are sent from the serial transmitter of the motor unit 110-1 to the motor unit 110-2.

When setting of the address is completed, the processor 232 switches the serial data bus line (step S405). Immediately after the power-on reset (step S401), the switch 234 was closed at A, and the serial data input from the serial line 116 via the input buffer 231 were input to a Serial-Input terminal of the processor 232 so that the processor could decode and execute the command. When the processor 232 receives a READ command directed to it, it causes the switch 234 to close at A by means of a control signal 236. As a result, READ data output from the terminal S OUT are fed onto the serial line 116. At the completion of address setting, however, the switch 234 is closed at B by another control signal 236 from the processor 232 (step S405) to become a bypass circuit. The serial data are then routed from the input buffer 231 via terminal B and the output buffer 235 to the second motor unit 110-2.

Next the main controller 106 sends an address-setting command to the motor unit 110-2 which is coupled in the second position in the series. The address field 141 of this command contains the same value (0) as when the address of the first motor unit 110-1 was set. The data area 145 of the data field 142 contains an address (the address "2" for example) specific to the second motor unit 110-2. The serial data sent from the main controller 106 are input by the first motor unit 110-1, bypassed without alteration via terminal B to the output buffer 235 of the first motor unit 110-1, and input by the second motor unit 110-2 (step S402). The serial data input by the first motor unit 110-1 are also fed via its Serial Input terminal SI to its processor 232 and compared with the address stored in its address register 233 (step S403), but since the value in the address register 233 is no longer 0 but the specific address ("1") of the motor unit 110-1, it is not equal to the value in the address field 141 of the serial data. Accordingly, the serial data are regarded as not constituting a command for the first motor unit 110-1 and are simply output as received with no processing performed (step S406).

The value in the address register 233 of the second motor unit 110-2 is still the initial value (0), which matches the value (0) in the address field 141 of the serial data 140, so the serial data 140 are recognized as constituting a command for the second motor unit 110-2 (step S403). The specific address of the second motor unit 110-2 is then set and its serial data bus is switched (steps S404 and S405) in the same way as was done for the first motor unit 110-1.

A similar process is repeated until the specific address of the n-th motor unit 110-n has been set in its address register 233 and its switch 234 has been closed to form a bypass circuit (step S405).

When all addresses have been set in this way, the main controller 106 begins sending commands to be executed by the various motor units. These commands are sent in the same serial data format as the address-setting commands shown in FIG. 10.

When serial data are received (step S407) by a motor unit, first the value in the address field 141 is compared with the contents of the address register 233 (step S408). If the serial data are thus recognized as a command to this motor unit, the command area 144 in the data field 142 is decoded and the command is executed to drive the motor (step S409). If serial data are sent with the value "2" in the address field, for example, the motor unit 110-2 having the matching value "2" stored in its address register 233 recognizes the match and executes the command.

If in step S408 the value of the address field 141 in the serial data does not match the contents of the address register 233, the serial data are regarded as pertaining to another motor unit and are left without taking further action.

As explained above, the access system in this embodiment is advantageous in that it does not require an address to be hard-wired into a circuit in the motor unit. The hardware of all the motor units can therefore be identical.

Figure 16:
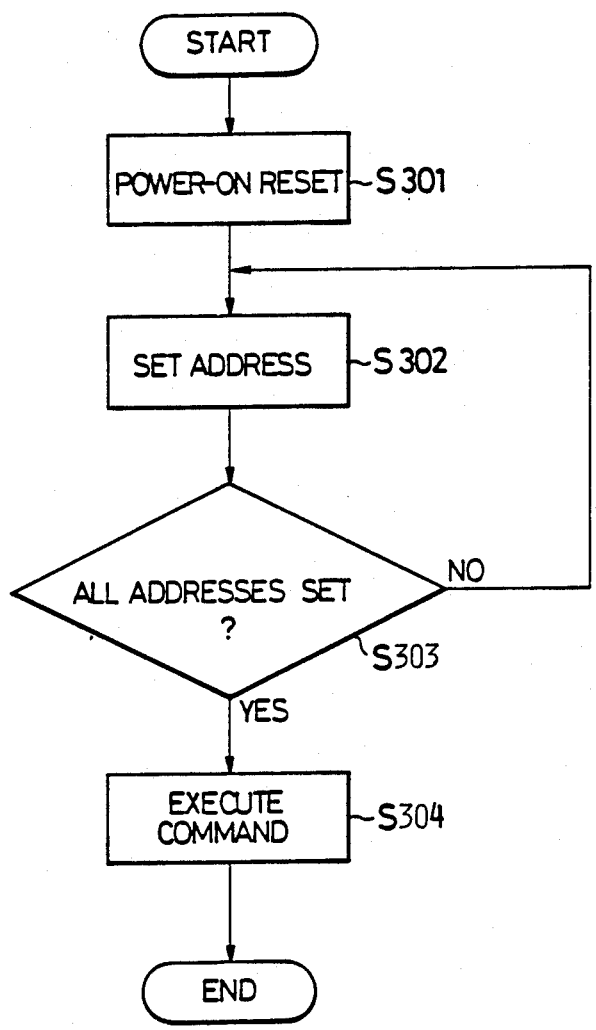
FIGS. 16 and 17 are flowcharts showing the operation of the embodiment of FIG. 15.

A modification shown in and described with reference to FIGS. 12 to 14 in connection with the embodiment of FIGS. 6 to 11 can be made to the above embodiment of FIGS. 15-17. In this modification, the process of bidirectional communication shown in FIG. 13 corresponds to steps S407 through S409 in FIG. 17. Among the commands that can be placed in the command area 144 of the serial data is a READ command. In place of "0" being written as described previously in connection with the step S204 of FIG. 13, the address of the main controller 106, which is set at initialization, is written in the address field 151, then the resulting serial data are sent (step S205). The switch 234 is closed at A in FIG. 15 during this process by a control signal 236, and is then switched back to B after the data have been sent.

If the command in the serial data received is determined in step S203 to be a motor control command, the command is executed (step S206) and the process ends. In this way data read from a certain motor unit pass through other intermediate motor units until they can be received by the main controller 106.

The value to which the address register 233 is cleared in the above modification was 0, but a value of 1 or any other constant value could be used instead.

The embodiments described above with reference to FIGS. 15 to 17 do not limit the scope of this invention, which can be modified in various ways. Furthermore, it is not always necessary for addresses to be set in all of the actuators; addresses could be set in only those devices which will actually be accessed.

The switch 234 forming the switching circuit can be configured from appropriate logic circuits in various ways.

In the embodiments as described above, in order to access a plurality of actuators connected in series to a controller, the control sections in the actuators are provided with an address register than can be externally set. At the initial reset, all these address registers are cleared to the same value, then an address specific to each actuator is set in the address register means of serial data input. The systems of the above embodiments accordingly do not require differing address data to be hard-wired into each actuator, so all the interface controller circuits are identical and can be implemented in an integrated-circuit chip, thereby simplifying the production process, reducing costs, and increasing reliability. A system corresponding to any of the above embodiments also enables as many actuators to be accommodated on a single serial line as the length of the address allows, thereby reducing the overall number of interconnection lines and offering great advantages in assembly and cost. Since any desired addresses can be set, the main controller can easily communicate with each of the actuators bidirectionally. In addition, a bypass in the serial data path in each actuator enables the data to be propagated with an extremely short delay, thereby enabling high-speed operation.

A further embodiment of this invention will be described next with reference to FIG. 18.

Figure 18:
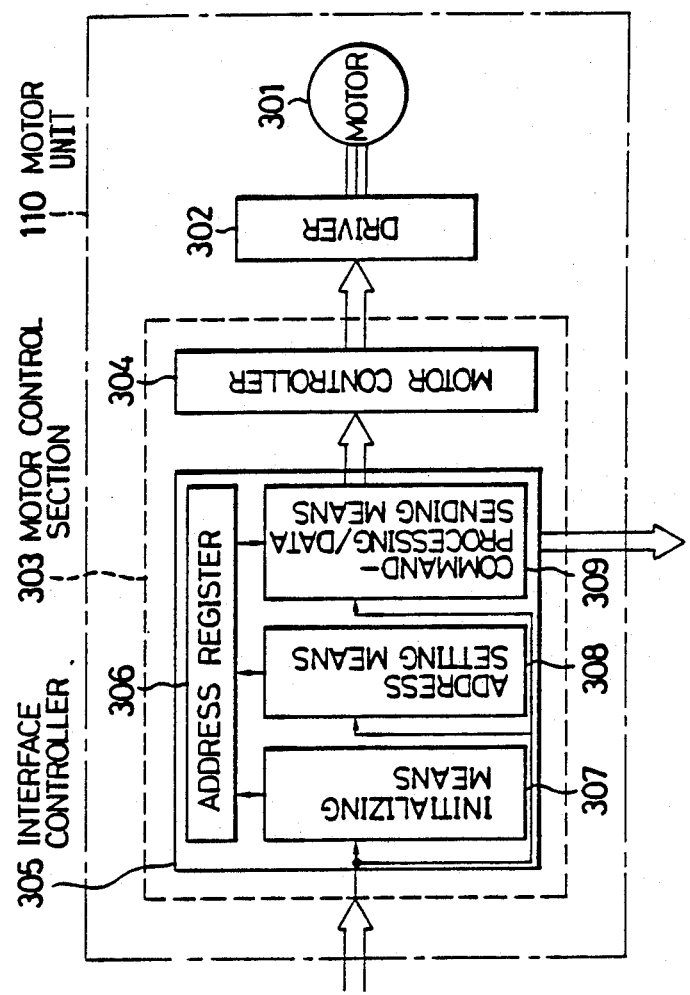
FIG. 18 is a block diagram of another embodiment of a motor control section used in another embodiment of the present invention.

FIG. 18 is a block diagram of an actuator which is in the form of a motor device that is controlled in the motor control system of the present invention, whose overall system configuration is generally identical to that shown in FIGS. 6 and 7, except for the structural details of the motor control section 303 which is used instead of the motor control section 120.

Each of the motor units 110 in the embodiment of FIG. 18 has the following structure. Each motor unit 110 of the embodiment of FIG. 18 includes a motor 301, a driver 302, and a motor control section 303. The motor control section 303 comprises a motor controller 304 and an interface controller 305. Each of the motor units 110 is characterized in that the interface controller 305 comprises an address register 306, initializing means 307, address-setting means 308, and command-processing/serial-data sending means 309. The address register 306 stores a specific address sent from the main controller 106 (shown in FIG. 6) for assignment to the particular motor unit 110. In other words, a "soft" address can be stored in the address register 306 from an external source. The initializing means 307 can be either hardware or software means for resetting or clearing the address register 306 to a fixed value such as 0 when a power-on reset is performed or a reset signal is received. The address-setting means 308 receives serial data containing the address value to be assigned to the motor unit 110 and stores this value in the address register 306 in an initial setup process. The command-processing/serial-data-sending means 309 tests the value in the address field 141 (as shown in FIG. 10) of serial data received after the initial setup and, if this value equals the address value in the address register 306 of this motor unit, regards the received serial data as a command pertaining to this motor unit and executes the command or, if the two values are not equal, regards the data as a command for another motor unit and sends the received serial data unaltered to the next motor unit.

The serial data format is identical to that shown in, and described with reference to, FIG. 10.

The operation of the actuator control system of the embodiment of FIG. 18 will now be explained with reference to FIG. 19.

Figure 19:
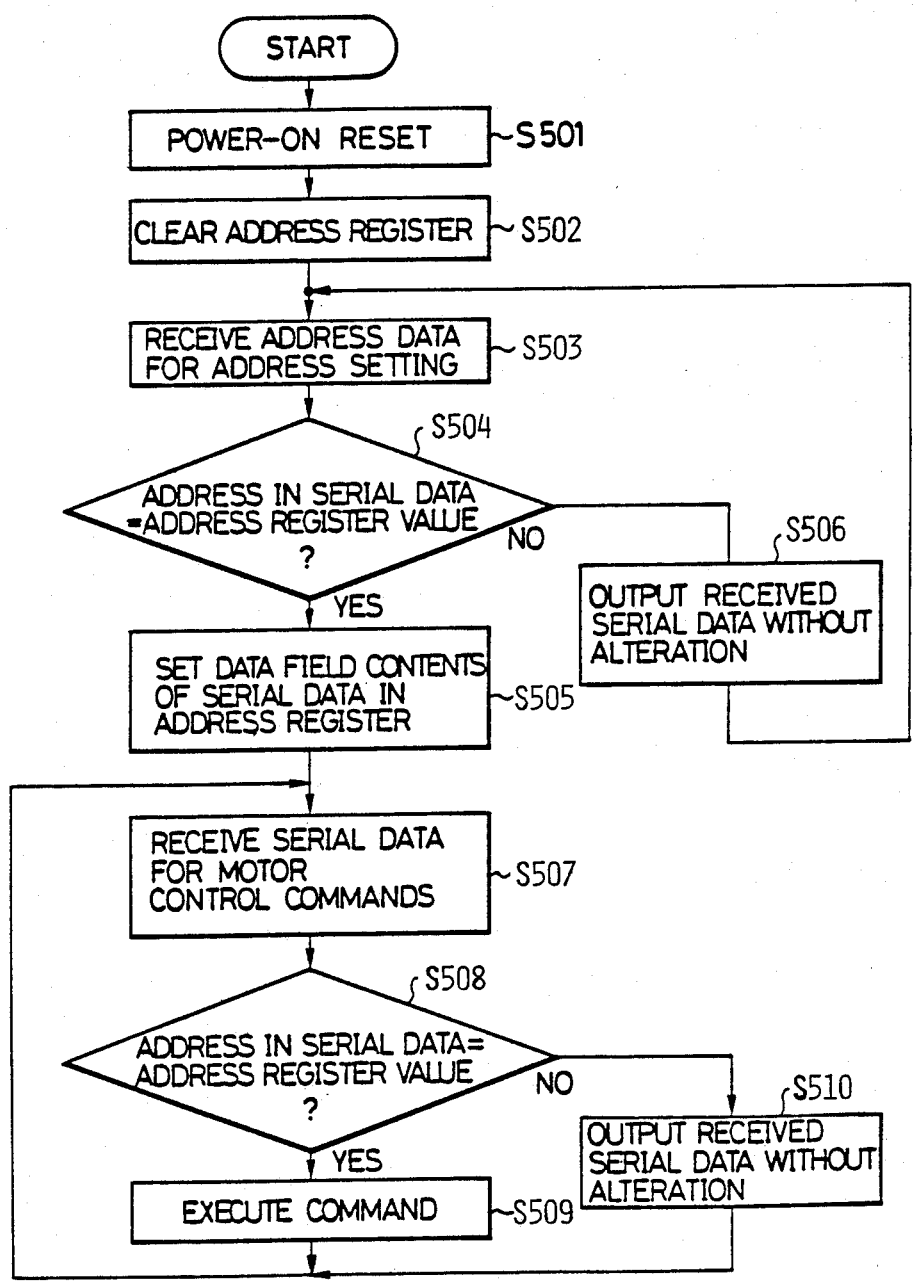
FIG. 19 is a flowchart showing the operation of the embodiment of FIG. 18.

FIG. 19 is a flowchart showing the operation sequence of the embodiment of FIG. 18. Step S501 is a reset process performed during a power-on or clearing process performed when a reset signal is received. This process resets all registers and counters in the motor unit 110 to their initial values. In the second step S502, all the address registers 306 in the motor units are cleared to the same value of 0. The above steps are performed by the initializing means 307.

Steps S503 through S510 constitute the address-setting mode, in which the main controller 106 (see FIG. 6) first sends an address-setting command to the first motor unit 110-1 in the series of coupled motor units. In the address area 143 of the address field 141 of the serial data shown in FIG. 10, the main controller 106 sets the value 0 to which the address register was cleared in the reset/clear step. In the command area 144 of the data field 142, the main control 106 inserts an address-setting command, and in the data area 145 the main controller 106 inserts the address value to be assigned to the motor unit 110-1. First the motor unit 110-1 receives the serial data (step S503) and tests whether the value in the address field 141 equals the value of 0 in the address register 306. If it does, the serial data are recognized as a command pertaining to this motor unit 110-1 and the process branches to step S505. In this step the contents of the command area 144 of the data field 142 are recognized as an address-setting command, and the value in the data area 145 is latched in the address register 306 to complete the setting of the address of the motor unit 110-1. Since the serial data were recognized as a command pertaining to this motor unit, the processing stops at this point and data are not sent to the next motor unit. The processes above are carried out by the address-setting means 308 and the command-processing/serial-data-sending means 309.

Next, the main controller 106 sends an address-setting command to the second motor unit 110-2 in the series of coupled motor units. The address field 141 and the command area 144 of the data field 142 of the serial data sent contain the same values as when the address of motor unit 110-1 was set—that is, the address value is 0—while the data area 145 of the data field 142 contains the address value to be assigned to the second motor unit 110-2. The serial data sent from the main controller 106 are first input to the first motor unit 110-1, which tests the data against the value in its address register 306. Since the value in this address register 306 is no longer 0, it does not equal the value in the address field 141, so these serial data are recognized as not pertaining to the motor unit 110-1. The command-processing/serial-data-sending means 309 of the motor unit 110-1 therefore sends these serial data onward without alteration to be received by the next motor unit 110-2. The value in the address register 306 of motor unit 110-2 is still at the initial value of 0, matching the value in the address field 141 of the serial data, so the serial data are recognized as a command pertaining to the motor unit 110-2. The address of motor unit 110-2 is then set by the value in the data area 145 in the same way as was the address of motor unit 110-1.

This process is repeated until the address of each of the motor unit 110-1 through 110-n has been set, thus completing the setting of all of the addresses.

When the setting of addresses has been completed, the main controller 106 sends various commands to be executed by the motor units 110. These commands are sent in the form of serial data having the same format as the address-setting commands shown in FIG. 10, and are executed by the procedure in steps S507 through S510 by the command-processing/serial-data-sending means 309. Step S507 is for receiving the serial data having an address field 141 and a data field 142, the data field 142 having a motor control command area 144 and a data area 145. In step S508 the value of the address field 141 is compared with the value of the address register 306 of this motor unit. If the two values are equal, the process proceeds from step S508 to step S509, in which the serial data are recognized as a command pertaining to this motor unit, the command area 144 of the data field 142 is decoded, and the motor unit 110-1 is driven. If the value in the address field 141 does not equal the value in the address register 306, these serial data are recognized as pertaining to another motor unit and the procedure branches to step S510, in which the command-processing/serial-data-sending means 309 sends the serial data to the next downstream motor unit without alteration. The data thus sent downstream are received by the next motor unit and the foregoing process is repeated.

The actuator control system of the embodiment of FIGS. 18 and 19 is characterized in that a serial-data-sending means and an address-register-setting means are provided in the motor unit, thereby eliminating the need for a circuit in which a hard-wired address is set. The actuator control system of this embodiment therefore has the advantage that the hardware in all the motor units can be exactly the same. Another advantage is that fan-out of the serial data always has a value of 1, so that adding connections for additional motor units does not suffer the disadvantage of increasing fan-out.

A modification such as that shown in and described with reference to FIGS. 12 to 14 in connection with the embodiment of FIGS. 6 to 11, can be made in the above embodiment of FIGS. 18 and 19. In this modification, the sending terminal of the command-processing/data-sending means 309 of the motor unit 110-n is linked to a data-receiving terminal in the main controller 106 to enable communication both to and from the main controller 106. FIG. 19 is a flowchart of the main part of the operation of this modified embodiment, as discussed further hereunder.

If, say, a READ command is sent from the main controller 106, a process identical to that shown in FIG. 13 is performed during the execution of this command in steps S507 through S510. First, as shown in FIG. 13, in step S202, the data field 142, including the command area 144 of the input serial data is decoded. At step S203, it is determined whether the command is a READ command or a motor control command (e.g., a WRITE command). If it is a READ command, in step S204 the requisite read data are written in the data field 162 of the outgoing serial data 160, and the address of the main controller 106, previously is set at initialization, is written in the address field 161. The resulting outgoing serial 160 are sent in step S205. If the command is a motor control command, it is executed in step S206, after which the process ends. The outgoing serial data 160 sent from the motor unit passes through other intermediate motor units and are received by the main controller 106.

The value to which the address register was cleared in the embodiments described above was 0, but a value of 1 or any other constant value could be used instead.

In the system according to the above embodiment for controlling a plurality of units connected in series to a main controller, the control section of each unit is as shown in FIG. 18 and includes an address register, an initializing means, an address-setting means, and a command-processing/serial-data-sending means, so it is not necessary for separate address data to be hard-wired into each motor unit. The same circuit arrangement can therefore be used for the control sections of all of the motor units. In particular, the arrangement for the motor control section of each of a plurality of motor units having identical drivers can be implemented in an integrated-circuit chip. This simplifies the manufacture of the motor units, holds down their cost, and increases their reliability. This invention also enables as many actuators as allowed by the length of the address to be accommodated on a single serial line, thereby reducing the overall number of interconnection lines and offering major advantages in installation and cost. Moreover, since any desired addresses can be set, the main controller can easily communicate with each of the actuators bidirectionally.

What is claimed is:

1. A system for accessing a plurality of electromechanical actuators by command signals sent by a main controller, each of the plurality of electromechanical actuators including a control section integrated with an electric motor, comprising:
   each of the plurality of electromechanical actuators are connected in series with each other by a serial data line originating from the main controller, the main controller providing serial data which includes an address value and a command signal to said serial data line, the control section in each electromechanical actuator including:
   an address register;
   means for setting and storing a fixed value in said address register as an address when the control section is initialized;
   a processor circuit for receiving said serial data and for determining whether said address value in the received serial data is equal to said address stored in said address register, said processor circuit producing a command according to said command signal when said address value is equal to said address;
   bypass means having an activated and an inactivated condition, said bypass means when in said activated condition bypassing said processor circuit such that said serial data applied to an input of said processor circuit is directed to the next electromechanical actuator along said serial data line;
   said processor circuit causing said bypass means to be in said activated condition when said address value in the received serial data does not equal said address stored in said address register; and
   a motor controller responsive to said processor circuit for sending drive signals to the electric motor.

2. A system according to claim 1, further comprising a return serial data line connected between the main controller and the last one of said electromechanical actuators along said serial data line, for transmitting serial data from the control section in the last one of said electromechanical actuators to the main controller.

3. A system according to claim 2, wherein said fixed value stored in said address register is 0.

4. A system according to claim 2, wherein said fixed value stored in said address register is set by a hardware arrangement when actuator power is first switched on.

5. A system according to claim 2, wherein said fixed value is set by a software arrangement when actuator power is first switched on.

6. A system for accessing a plurality of electromechanical actuators by signals from a main controller, each of the signals being in the form of serial data including an address field and a data field, comprising:
   a serial data line originating from the main controller connecting the plurality of actuators in series with each other;
   each electromechanical actuator including a control circuit, a drive circuit, and an electric motor; each said drive circuit being responsive to control signals received from said control circuit to drive said electric motor; each said control circuit including an interface controller and a motor controller, said motor controller receiving command signals from said interface controller and supplying said control signals to said drive circuit, said interface controller including:
   a receiver for receiving serial data from the serial data line,
   a processor for performing a predetermined operation on address data contained in the address field of the serial data received to obtain a result and, when said result equals a predetermined value, said processor determining an actuator command contained in the data field of the serial data received and supplying said actuator command to said motor controller to control the motor, and when said result does not equal said predetermined value, said processor substituting said result for said address data in said address field to produce output serial data which is intended for a different one of said electromechanical actuators, and
   a transmitter for sending said output serial data to the next actuator along the serial data line.

7. A system according to claim 6, further comprising a further serial data line connected between the control circuit in the last downstream one of the plurality of electromechanical actuators and the main controller for carrying serial signal data transmitted from the last downstream one of the plurality of electromechanical actuators to the main controller.

8. A system according to claim 6, wherein said predetermined operation performed by said processor is one of a decrement operation and an increment operation.

9. A system according to claim 6, wherein said predetermined operation performed by said processor is one of (a) a left-shift (multiply-by-2) operation and (b) a right-shift (divide-by-2) operation.

10. An actuator control system comprising:
    a plurality of electromechanical actuators, each having an electric motor, a driver for driving said electric motor, and a control section for supplying control signals to said driver;
    a main controller for controlling the operation of each of said plurality of actuators;
    a serial data line for coupling each of said plurality of actuators to said main controller in series with each other;

said control section of each respective one of said plurality of actuators including:

an address register, settable by said main controller, for storing an address value pertaining to the respective one of said plurality of actuators;

initializing means for initializing said address register at one of a power-on reset and an initial reset;

address-setting means for setting said address value pertaining to the respective one of said plurality of actuators in said address register according to serial data received from said main controller at initial setup;

command-processing/serial-data-sending means for comparing an address value in input serial data received after said initial setup with said address value in said address register and, if the two values are equal, executing a process commanded by said main controller and inhibiting the sending of said input serial data to the next one of said plurality of actuators along said serial data line and, if the two values are not equal, sending said input serial data unaltered to the next one of said plurality of actuators along said serial data line.

* * * * *